No. 854,265. PATENTED MAY 21, 1907.
H. L. BOWDOIN.
THEATRICAL APPARATUS.
APPLICATION FILED AUG. 13, 1906.

WITNESSES
H. A. Lamb.
Arthur Marion.

INVENTOR
Harry L. Bowdoin
BY
Chas. C. Gill
ATTORNEY

UNITED STATES PATENT OFFICE.

HARRY L. BOWDOIN, OF NEW YORK, N. Y.

THEATRICAL APPARATUS.

No. 854,265.

Specification of Letters Patent.

Patented May 21, 1907.

Application filed August 13, 1906. Serial No. 330,484.

*To all whom it may concern:*

Be it known that I, HARRY L. BOWDOIN, a citizen of the United States, and a resident of New York city, in the county of New York and State of New York, have invented certain new and useful Improvements in Theatrical Apparatus, of which the following is a specification.

The invention relates to improvements in theatrical apparatus, and consists in the novel features, arrangements and combinations of parts hereinafter described, and particularly pointed out in the claims.

The object of my invention is to provide novel apparatus for use in giving exhibitions or performances whereby in connection with a tank of water, drowning, disappearing, rescuing and other scenes may be effected, and to this end my invention preferably comprises a stage, a tank for water built therein and air containing means anchored below the surface of the water and into which persons jumping or diving into the tank may insert their heads so as to breathe the air therein, whereby such persons may remain below the surface of the water any desired length of time.

Figure 1:
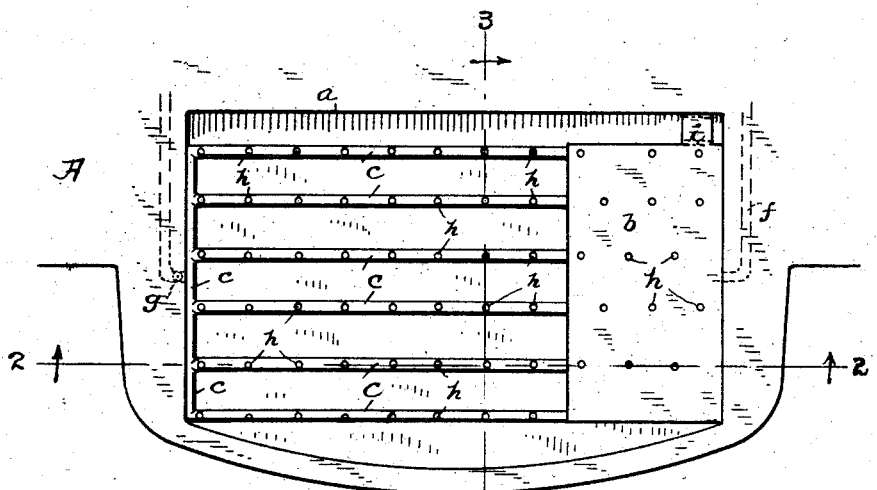
Figure 2:
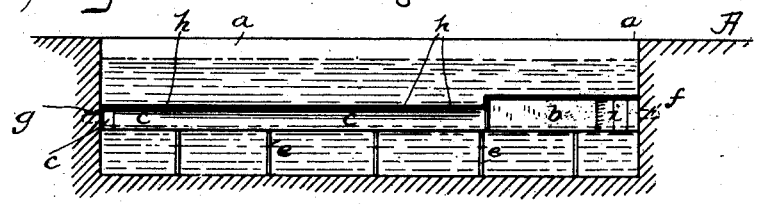
Figure 3:
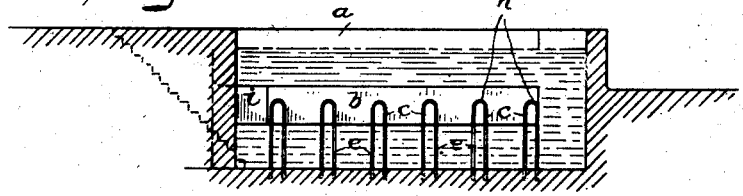

My invention also embraces novel constructions and arrangements of the air containing means enabling the person or persons below the surface of the water to move about, and also other novel features, all of which will be fully understood from the detailed description hereinafter presented, reference being had to the accompanying drawings, in which:

Figure 1 is a top plan view of a stage equipped with a tank and air containing means anchored therein and embodying my invention; Fig. 2 is a vertical longitudinal section of same on the dotted line 2—2 of Fig. 1; Fig. 3 is a vertical transverse section of same on the dotted line 3—3 of Fig. 1, and Fig. 4 is a detached vertical section through a modified form of air reservoir or air containing means adapted for use in the tank.

In the drawings, A designates a stage or platform of any suitable outline and size, $a$ a commodious tank therein adapted to contain water, $b$ a box secured within one end of said tank wholly or partly below the water level and open at its lower side, and $c$ a series or frame of inverted U-shaped submerged members or half-tubes which constitute air reservoirs, being closed at their upper sides and open at their lower sides. The half-tubes may extend longitudinally from one side of the box $b$ and have their other ends connected by a corresponding transverse member, as shown in Fig. 1, whereby said half-tubes form a connected air reservoir of considerable air capacity and below which persons may move about with their heads therein. The box $b$ and half-tubes $c$ may be secured in position by any suitable means but preferably by vertical bars $e$ fastened at their lower ends in the bottom of the tank, and said box and half-tube reservoirs may be supplied with air under pressure through a pipe $f$, whereby the air in the box and reservoirs may be renewed from time to time and the water kept at the proper level within the open mouths of said box and reservoirs. An escape valve $g$ is provided for regulating the escape of air from the reservoirs. The tops of the box $b$ and reservoirs $c$ are provided with transparent lights $h$ through which persons below the same may observe what is transpiring on or about the surface of the water. Leading from the box $b$ is an air-lock or exit $i$ through which egress may be had below the surface of the water.

The box $b$ constitutes an air reservoir below which several persons may assemble, and it is intended that a person acting as a guard shall be stationed in said box to prevent any accidents to performers in the tank. The box $b$ should be sufficiently elevated to enable a person to stand below it with his head in the air chamber formed within said box, and the half-tube members $c$ will preferably be at such elevation that a person resting on one knee with the other leg bent into right-angular form may have his head within the air chamber formed by said members.

Figure 4:
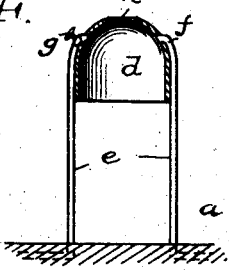

In Fig. 4 I illustrate a modified form of air-reservoir, lettered $d$, this reservoir being in the form of an inverted receptacle provided with a light $h$ and secured by anchors $e$, which in this instance may be tubular so as to form within them the inlet and outlet pipes for air.

I do not limit my invention to the use of the box $b$ nor to any special form, construction or arrangement of the open air reservoirs submerged within the tank for the use of the performers, since it is obvious that these reservoirs may be variously constructed and disposed. If the reservoir is of elongated form, as shown in Fig. 1, a performer may very conveniently move along below it from one point to another, but with less convenience a performer may move from one to another individual air reservoir $d$ with like effect so far as the general performance is concerned.

The apparatus hereinbefore described may be made use of in various kinds of plays or performances not necessary to detail, but the more important result of the same is that a performer may remain below the surface of the water any desired length of time and while below the surface move from point to point as may seem desirable.

The air reservoirs may be lighted to facilitate free movement within or below them.

What I claim as my invention and desire to secure by Letters-Patent, is:—

1. In combination with a stage or platform, a tank for containing water, and air containing means secured therein below the water line and open at the lower side thereof, said means being adapted to enable a person in the water to place his head therein for breathing purposes; substantially as set forth.

2. In combination with a stage or platform, a tank for containing water, air containing means secured therein below the water line and open at the lower side thereof, said means being adapted to enable a person in the water to place his head therein for breathing purposes, and means for supplying air to said containing means and permitting the escape of air therefrom; substantially as set forth.

3. The stage or platform, and the tank adapted to hold water, combined with an elongated air reservoir secured in said tank below the water line and open at its lower side, whereby a performer entering the water may be enabled to place his head within said reservoir for breathing purposes; substantially as set forth.

4. The tank for containing water, and a series of air reservoirs secured therein below the level of the water and open at their lower sides to receive the heads of performers, for breathing purposes; substantially as set forth.

5. The tank for containing water, and a series of air reservoirs secured therein below the level of the water and open at their lower sides to receive the heads of performers, for breathing purposes, said reservoirs having lights in their tops; substantially as set forth.

6. In combination with a stage or platform, a tank for containing water, and air containing means secured therein below the water line and open at the lower side thereof, said means being adapted to enable a person in the water to place his head therein for breathing purposes and having a light at the top thereof; substantially as set forth.

7. The tank for containing water, the box air-reservoir therein and having an exit therefrom and being open at its lower side, and a series of air-reservoirs secured in said tank and open at their lower sides; substantially as and for the purposes set forth.

8. The tank for containing water, the box air-reservoir therein open at its lower side, and a series of air-reservoirs secured in said tank and open at their lower sides; substantially as and for the purposes set forth.

9. The tank for containing water, the box air-reservoir therein open at its lower side, and a series of elongated air-reservoirs extending from the side of said box and open at their lower sides; substantially as and for the purposes set forth.

Signed at New York city, in the county of New York and State of New York this 8th day of August A. D. 1906.

HARRY L. BOWDOIN.

Witnesses:
CHAS. C. GILL,
ARTHUR MARION.